United States Patent
Harrison et al.

(10) Patent No.: US 6,291,553 B1
(45) Date of Patent: Sep. 18, 2001

(54) PRODUCTION OF MONODISPERSE SPHERICAL POLYMERS USING SEED POLYMERS WITH A COMB STRUCTURE

(75) Inventors: David Bryan Harrison, Leverkusen; Wolfgang Podszun, Köln, both of (DE); Frank Louwet, Diepenwek (BE)

(73) Assignee: AGFA-Gevaert (BE)

( * ) Notice: Subject to any disclaimer, the term of this patent is extended or adjusted under 35 U.S.C. 154(b) by 0 days.

(21) Appl. No.: 09/419,413

(22) Filed: Oct. 15, 1999

(30) Foreign Application Priority Data

Oct. 23, 1998 (DE) ............................................... 198 48 897

(51) Int. Cl.[7] ....................... C08F 291/00; C08F 265/04; G02F 1/1339; B41M 5/00; B29C 67/00
(52) U.S. Cl. ...................... 523/223; 524/529; 524/457; 524/458; 526/201; 526/329.7
(58) Field of Search ........................ 523/223; 524/529, 524/457, 458; 526/329.7

(56) References Cited

U.S. PATENT DOCUMENTS

| | | | |
|---|---|---|---|
| 4,130,523 | 12/1978 | Hoy et al. . | |
| 4,186,120 | 1/1980 | Ugelstad | 260/29.6 |
| 4,226,752 | 10/1980 | Erickson et al. . | |
| 4,336,173 | 6/1982 | Ugestad | 531/205 |
| 4,459,378 | 7/1984 | Ugelstad | 523/205 |
| 4,614,708 | 9/1986 | Timmerman et al. | 430/517 |
| 4,861,818 | 8/1989 | Timmermann et al. | 524/460 |
| 4,952,651 | 8/1990 | Kasai et al. | 526/201 |
| 4,996,265 | * 2/1991 | Okubo et al. | 525/424 |
| 5,147,937 | 9/1992 | Frazza et al. | 525/243 |
| 5,189,107 | 2/1993 | Kasai et al. | 525/244 |
| 5,219,943 | 6/1993 | Akasaki et al. . | |
| 5,817,206 | 10/1998 | McAlea et al. . | |

FOREIGN PATENT DOCUMENTS

| | | | |
|---|---|---|---|
| 196 34 393 | 3/1998 | (DE) . | |
| 0 080 225 | 6/1983 | (EP) . | |
| 101 943 | 7/1983 | (EP) . | |
| 044 391 | 3/1992 | (EP) . | |
| 0 709 400 | 5/1996 | (EP) . | |
| 0 821 017 A2 | 1/1998 | (EP) . | |
| 821017 | * 1/1998 | (EP) | C08F/220/10 |
| 0 610 522 | 4/1999 | (EP) . | |

* cited by examiner

Primary Examiner—David W. Wu
Assistant Examiner—K C Egwim
(74) Attorney, Agent, or Firm—Connolly Bove Lodge & Hutz LLP

(57) ABSTRACT

Producing spherical polymers having a weight-averaged average particle diameter of 1 to 50 μm using a seed/feed process comprising the following steps: a) suspension of a monodisperse spherical seed in an aqueous phase, b) addition of at least one monomer and an initiator, c) polymerization of the monomer, of which there is at least one, wherein the seed consists of a polymer having a comb structure, gives rise to products having a particularly narrow grain size distribution.

18 Claims, No Drawings

PRODUCTION OF MONODISPERSE SPHERICAL POLYMERS USING SEED POLYMERS WITH A COMB STRUCTURE

This invention relates to the production of monodisperse spherical polymers having a weight-averaged average particle diameter of 1–50 μm by a seed/feed process.

Spherical polymers having an average particle size of 1 to 50 μm are widely used, for example as spacers for film materials, as supports for catalysts, as calibration materials for light scattering measurements or as starting materials for chromatographic resins and ion exchangers. Polymers having the most uniform possible particle size (herein-after referred to as "monodisperse") are desired for many applications.

Monodisperse, spherical polymers having particle sizes of 1 to 10 μm may be produced by so-called dispersion polymerisation. A suitable process is described, for example, in EP 80 225, 610 522, U.S. Pat. Nos. 4,861,818 and 4,614,708. In dispersion polymerisation, a solvent is used, in which the monomers used are soluble, but the polymer formed is not. It has, however, been found that a predetermined particle size is not easy accurately to produce by dispersion polymerisation and that it is difficult even to produce relatively large particles (for example larger than 8 μm). Another characteristic feature is that the particle size distribution becomes distinctly wider as particle size increases, i.e. it becomes less monodisperse.

Spherical polymers having a particle size of approx. 10 to 1000 μm may be obtained by suspension polymerisation. Suspension polymerisation is taken to mean a process in which a monomer or monomer mixture, which contains an initiator soluble in the monomer(s), is dispersed in droplet form, optionally mixed with small, solid particles, in a phase which is substantially immiscible with the monomer(s) and contains a dispersant, and polymerisation is performed by increasing the temperature with stirring. Further details of suspension polymerisation are described, for example, in the publication *Polymer Processes*, edited by C. E. Schildknecht, published in 1956 by Interscience Publishers Inc., New York, in the chapter "Polymerization in Suspension" on pages 69 to 109. One disadvantage of suspension polymerisation is the broad particle size distribution of the resultant bead polymers.

There was accordingly a requirement for a process for the production of monodisperse spherical polymers of specific particle sizes of 1 to 50 μm.

It is known according to DE 196 34 393 that a seed/feed process may give rise to spherical polymers of a specific particle size. The term seed/feed process is taken to mean a process in which a polymer (so-called seed) is swollen with a monomer or monomer mixture (so-called feed) and is then polymerised. The process may be performed statically or dynamically. In the static process, the entire quantity of monomer or monomer mixture is added at once to the seed at room temperature. Once the seed has swollen, polymerisation is performed by increasing the temperature. In the dynamic process, the monomer or monomer mixture is added continuously to the seed under polymerisation conditions over a certain period of time.

One disadvantage of the seed/feed process, in particular of the static process, is the occurrence of a new generation of particles, which are produced by unabsorbed monomer. The particle size distribution of the resultant seed/feed polymer thus does not always correspond to the particle size distribution theoretically achievable from the seed, but is instead generally somewhat wider. Since a monodisperse polymer is required for many applications, the new generation of particles must be separated from the desired seed/feed polymer by additional process steps.

In order to increase the efficiency of the seed/feed process and thus suppress the occurrence of a new generation of particles, it is possible according to EP 101943 to add the monomer or monomer mixture under polymerising conditions, by the so-called dynamic seed/feed process. The term efficiency is taken to mean the proportion of the monomer which soaks into the seed and polymerises therein relative to the total quantity of monomer added. However, with conventional seed polymers, as are known from EP 448 391, the efficiency is limited. The so-called static seed/feed process according to DE 196 34 393, in which the monomer is added completely to the seed before it is polymerised by increasing the temperature, provides a robust, reproducible, widely applicable seed/feed process. However, a microencapsulated seed must be used in this process.

Special variants for increasing the efficiency of the general static seed/feed process are known. According to U.S. Pat. Nos. 4,459,378, 4,336,173, EP 709 400 and EP 308 864, the seed, which consists of normal high molecular weight polymer, is swollen by means of special, lower molecular weight organic compounds (so-called swelling auxiliaries). The monomer is then added to the treated seed and polymerised. Treating the seed with the swelling auxiliary is, however, very complex and demands numerous steps. Another disadvantage of this process is that the organic compounds used as swelling auxiliaries are enclosed in the finished seed/feed polymer and have a negative effect on the mechanical properties of the seed/feed polymers. The seeds treated with the swelling auxiliary are furthermore usually no longer spherical, which gives rise to non-spherical seed/feed polymers.

In another variant of the static seed/feed process according to EP 190 886, the monomer feed is added as a microemulsion to the normal, high molecular weight spherical seed. However, in this variant, the particle size of the monomer droplets in the feed emulsion is extraordinarily critical to the success of the process. Moreover, due to the microemulsion which is required, the process has only limited applicability on the larger scale.

It is known to use special seeds in order to be able to perform a technically simple static seed/feed process while nevertheless achieving elevated efficiency. According to U.S. Pat. Nos. 5,189,107, 4,186,120 and 4,952,651, seeds are used which consist of polymers having a molecular weight ($M_w$) of below 10000 g.mol$^{-1}$. One disadvantage of this process resides in the poor availability of the seed. According to the prior art, it is not possible to produce such a seed with a high monodispersity. The use of such seeds accordingly does not give rise to monodisperse seed/feed polymers.

It has now been found that both the static and the dynamic seed/feed processes may be performed very simply with elevated efficiency and yield monodisperse, spherical polymers having a particle size distribution which is an exact, enlarged reproduction of the introduced monodisperse, spherical seed, if the seed consists of a polymer having a comb structure.

The present invention provides a process for the production of monodisperse spherical polymers having a weight-averaged average particle diameter of 1 to 50 μm using a seed/feed process, characterised in that the seed used is a monodisperse, spherical seed which consists of a polymer which has a comb structure.

A polymer having a comb structure is taken to mean a polymer which consists of a main chain and a plurality of long side chains. For the purposes of the invention, a comb structure is present, for example, in graft polymers and in polymers having long-chain or short-chain branches. Highly suitable polymers having a comb structure are also copolymers with comonomers containing long-chain residues. Copolymers prepared from methyl (meth)acrylate and $C_2$ to $C_{22}$ alkyl (meth)acrylates are preferred. Particularly preferred copolymers are those prepared from methyl (meth) acrylate and $C_6$–$C_{22}$ alkyl (meth)acrylates which in particular have a solubility in water of at most 0.03 wt. % at 25° C. (cf EP 615 158 for definition). The term (meth)acrylate is intended to mean both acrylate and methacrylate. Particularly preferred copolymers are those prepared from a) 99.5 to 80 wt. %, in particular 99 to 85 wt. %, of methyl (meth)acrylate, preferably 98 to 90 wt. % of methyl (meth)acrylate, b) 0.5 to 20 wt. %, in particular 1 to 15 wt. %, preferably 2 to 10 wt. %, of at least one (meth)acrylic acid alkyl ester having a $C_2$ to $C_{22}$ alkyl residue or $C_6$ to $C_{22}$ alkyl residue.

For the purposes of the invention, (meth)acrylic acid alkyl esters having a $C_2$ to $C_{22}$ alkyl residue are the esters of acrylic acid and methacrylic acid with $C_2$ to $C_{22}$ alcohols. Methacrylic acid esters are preferred. The alkyl residue may be interrupted by oxygen atoms. The following may be mentioned by way of example, ethyl methacrylate, n-propyl methacrylate, iso-propyl methacrylate, n-butyl methacrylate, iso-butyl methacrylate, n-hexyl methacrylate, 2-ethylhexyl methacrylate, n-octyl methacrylate, n-decyl methacrylate, methoxyethyl methacrylate, methoxybutyl methacrylate, triethylene glycol monomethacrylate, n-dodecyl methacrylate, tridecyl methacrylate and stearyl methacrylate. Preferred methacrylic acid esters are those having a linear $C_{10}$ to $C_{22}$ alkyl residue, particularly preferably those having a $C_{12}$ to $C_{18}$ alkyl residue, in particular n-dodecyl methacrylate and stearyl methacrylate.

The spherical seed preferably has an average particle size of 0.5 to 15 μm, preferably of 1 to 12 μm, particularly preferably of 3 to 10 μm.

The ratio of the $90^{th}$ centile value (Ø(90)) and the $10^{th}$ centile value (Ø(10)) of the volume distribution is calculated as a measure of the width of the particle size distribution of the spherical polymers. For the purposes of the invention, monodisperse spherical seeds have particle size distributions Ø(90)/Ø(10) of less than 2.0, preferably of less than 1.5.

The polymers suitable as the seed may be produced using per se known processes. One highly suitable process is so-called dispersion polymerisation, which is comprehensively described in EP 610 522. The process disclosed in U.S. Pat. No. 4,614,708 may also be used to produce seed polymers which are suitable according to the invention. Mixtures of methyl methacrylate and the above-stated comonomers may, for example, be reacted together.

The static seed/feed process according to the invention comprises the following steps:

a) suspension of the monodisperse spherical seed, which consists of a polymer having a comb structure, in an aqueous continuous phase, b) addition of a mixture of one or more monomer(s) and an initiator, wherein this mixture soaks into the seed, c) polymerisation of the swollen seed to yield bead polymers at elevated temperature.

The dynamic seed/feed process according to the invention comprises the following steps:

a) suspension of the monodisperse spherical seed, which consists of a polymer having a comb structure, in an aqueous continuous phase, b) heating of the suspension to polymerisation temperature, c) addition of at least one water-insoluble monomer and a polymerisation initiator to the stated suspension at a rate of addition of the monomer of at most ⅓₀g, relative to 1 g of the initially introduced polymer per minute.

Although both processes are highly suitable, the dynamic process is preferable because the achievable efficiency is greater. Larger polymer spheres having good monodispersity are consequently obtainable in a comparable or shorter time than using the static method.

In the seed/feed process according to the invention, the seed is suspended in an aqueous phase, wherein the ratio of seed and water is largely non-critical. It may be, for example, between 1:1 and 1:100, preferably between 1:2 and 1:10. The suspension may be prepared, for example, using a normal gate or paddle stirrer, wherein low to moderate shear forces are used.

The seed/feed process according to the invention is preferably performed in the presence of a surfactant. The surfactant may be ionic or nonionic. Ionic surfactants are preferred. Ethoxylated nonylphenols are examples of nonionic surfactants. Suitable anionic surfactants are alkylsulfonates and especially the sodium salts of sulfosuccinic acid esters. N-Alkylammonium salts, such as for example methyltricaprylammonium chloride, may be mentioned as cationic surfactants. Salts of sulfosuccinic acid esters are preferred. The surfactant is used in a quantity of 0.05 to 5 wt. %, preferably of 0.1 to 2 wt. %, relative to the aqueous phase.

Hydrophilic polymeric stabilisers may furthermore be use, for example polyethylene oxide, low molecular weight polyvinyl alcohol, polyvinylpyrrolidone, vinyl alcohol/vinyl acetate copolymer containing 12 or 40 mol% of vinyl acetate units, the sodium and potassium salts of styrene/acrylic acid copolymers containing 40 to 60 mol% of acrylic acid, vinyl acetate/crotonic acid copolymer, the reaction products of styrene/maleic anhydride copolymer, vinyl acetate/maleic anhydride copolymer, ethylene/maleic anhydride copolymer, N-vinylpyrrolidone/maleic anhydride copolymer with hydroxyalkyl or aminoalkyl (meth)acrylates, monosodium salt of styrene/maleic acid copolymer and particularly preferably the latter containing 60 mol% of styrene.

In the static process, the monomer or monomer mixture and initiator are fed at room temperature, but in any event at a temperature at which the initiator used is inactive. The rate of addition of the feed is not highly critical. The feed is normally added to the suspended seed within 5 to 120 minutes. In the dynamic process, the initiator may be present in the reaction vessel from the outset or may be added together with the monomer or monomer mixture under polymerisation conditions. For the purposes of the seed/feed process according to the invention, the monomers are $C_1$ to $C_{22}$ esters of acrylic and methacrylic acid as well as silane monomers according to EP-A417 539, U.S. Pat. Nos. 5,646, 210 and 5,716,771. $C_1$ to $C_8$ alkyl esters are preferred, in particular $C_1$ to $C_4$ alkyl esters of methacrylic acid. The following may be mentioned by way of example, ethyl methacrylate, n-propyl methacrylate, iso-propyl methacrylate, n-butyl methacrylate, iso-butyl methacrylate. Methyl methacrylate is very particularly preferred. The added mixture may also contain a proportion of crosslinking agents. Suitable crosslinking agents are ethylene glycol dimethacrylate, trimethylolpropane triacrylate, butanediol dimethacrylate, triethylene glycol dimethacrylate and allyl methacrylate. The proportion of crosslinking agents may be, for example, 0.1 to 25 wt. %, preferably 0.5 to 15 wt. %, relative to the monomer mixture.

Suitable initiators are compounds which form free radicals when the temperature is raised. The following may be mentioned by way of example: peroxides such as dibenzoyl peroxide, dilauryl peroxide, bis-(p-chlorobenzoyl peroxide), dicyclohexyl peroxydicarbonate, as well as peroxy esters such as tert.-butylperoxy isobutyrate, tert.-butylperoxy pivalate, tert.-butylperoxy 2-ethylhexanoate and 2,5-bis(2-ethylhexanoyl-peroxy)-2,5-dimethylhexane. Further highly suitable initiators are azo compounds such as 2,2'-azobis (isobutyronitrile) and 2,2'-azobis(2-methylisobutyronitrile).

The initiators are generally used in quantities of 0.05 to 6.0 wt. %, preferably of 0.2 to 4.0 wt. %, relative to the monomer mixture.

The mass ratio of seed to feed (seed/feed ratio) is generally 1:1 to 1:20, preferably 1:2 to 1:10.

The stirring speed during polymerisation is not highly critical and, unlike in conventional suspension polymerisation, has no influence upon particle size. Low stirring speeds are used which are sufficient to keep the suspended particles in suspension and to promote the dissipation of the heat of polymerisation.

In the static process, once the feed has been added, the mixture of the suspended seed and feed is stirred at a temperature at which the initiator used is inactive. During this time, the so-called swelling time, the feed soaks into the seed. A swelling time of between 15 minutes and 10 hours is normally used.

The polymerisation temperature is determined by the decomposition temperature of the initiator used. It is generally between 50 and 100° C., preferably between 75 and 85° C. Polymerisation lasts from 0.5 to several hours. After the polymerisation, the seed/feed polymer may be isolated from the reaction mixture by filtration or particularly advantageously by settling by means of a centrifuge or a decanter and, optionally after one or more washings, be dried.

The seed/feed polymers according to the invention have a diameter at least 20% larger than that of the seed polymers used for the production thereof.

The polymers obtained using the process according to the invention may be used, for example, as spacers for film materials, as supports for catalysts or as starting materials for chromatographic resins and ion exchangers. They are moreover ideally suitable for the production of 3D models by laser sintering (so-called "rapid prototyping").

The term rapid prototyping encompasses those computer-controlled, additive, automatic modelling processes which are currently known. Laser sintering refers to a rapid prototyping process in which beds of certain pulverulent materials are heated and sintered at coordinates under the action of, preferably software-controlled, laser beams.

The spherical polymers according to the invention are furthermore suitable as spacers for LCD screens and image-receiving materials for non-impact printing processes. Spherical polymers according to the invention which contain proportions of silane monomers according to U.S. Pat. No. 5,646,210 and EP 417 539 are particularly suitable as spacers for LCD screens.

EXAMPLES

Production of Seeds Without a Comb Structure

Seed O-1

2400 g of methanol, 300 g of methyl methacrylate and 180 g of polyvinylpyrrolidone K30 were mixed to yield a homogeneous solution in a 4 liter reactor equipped with a gate stirrer. At a stirring speed of 100 rpm, this solution was heated to 55° C. within 1 hour under nitrogen and a solution of 3 g of 2,2'-azobis(isobutyronitrile) in 117 g of methanol was added to the reactor. The polymerisation mixture was stirred for a further 20 hours at 55° C. and 100 rpm. The finished polymer dispersion was then cooled to room temperature. The resultant seed polymer was isolated in a methanol-moist state by settling and decanting.

The moist seed polymer was washed twice with 2 liter portions of methanol and twice with 2 liter portions of water in order to obtain a water-moist seed polymer. An aqueous dispersion containing 20.0 wt. % of seed polymer was then prepared. The particle size of the resultant seed polymer and the monodispersity thereof are shown in Table 1.

Seed O-2

1835 g of methanol, 400 g of water, 300 g of methyl methacrylate and 180 g of polyvinylpyrrolidone K30 were mixed to yield a homogeneous solution in a 4 liter reactor equipped with a gate stirrer. At a stirring speed of 100 rpm, this solution was heated to 55° C. within 1 hour under nitrogen and a solution of 9 g of 2,2'-azobis(isobutyronitrile) in 165 g of methanol was added to the reactor. The polymerisation mixture was stirred for a further 20 hours at 55° C. and 100 rpm. The finished polymer dispersion was then cooled to room temperature. The resultant seed polymer was isolated in a methanol-moist state by settling and decanting.

The seed polymer was worked up as in the case of seed O-1. The particle size of the resultant seed polymer and the monodispersity thereof are shown in Table 1.

Seed O-3

2400 g of methanol, 300 g of methyl methacrylate and 180 g of polyvinylpyrrolidone K30 were mixed to yield a homogeneous solution in a 4 liter reactor equipped with a gate stirrer. At a stirring speed of 100 rpm, this solution was heated to 55° C. within 1 hour under nitrogen and a solution of 12 g of 2,2'-azobis(isobutyronitrile) in 158 g of methanol was added to the reactor. The polymerisation mixture was stirred for a further 20 hours at 55° C. and 100 rpm. The finished polymer dispersion was then cooled to room temperature. The resultant seed polymer was isolated in a methanol-moist state by settling and decanting.

The seed polymer was worked up as in the case of seed O-1. The particle size of the resultant seed polymer and the monodispersity thereof are shown in Table 1.

Seed O-4

2343 g of methanol, 300 g of methyl methacrylate and 180 g of polyvinylpyrrolidone K30 were mixed to yield a homogeneous solution in a 4 liter reactor equipped with a gate stirrer. At a stirring speed of 100 rpm, this solution was heated to 55° C. within 1 hour under nitrogen and a solution of 12 g of 2,2'-azobis(isobutyronitrile) in 165 g of methanol was added to the reactor. The polymerisation mixture was stirred for a further 20 hours at 55° C. and 100 rpm. The finished polymer dispersion was then cooled to room temperature. The resultant seed polymer was isolated in a methanol-moist state by settling and decanting.

The seed polymer was worked up as in the case of seed O-1. The particle size of the resultant seed polymer and the monodispersity thereof are shown in Table 1.

Seed O-5

Polymerisation was performed as for seed O-3, but at a stirring speed of 50 rpm, instead of 100 rpm. The seed polymer was worked up as in the case of seed O-1. The particle size of the resultant seed polymer and the monodispersity thereof are shown in Table 1.

Seed O-6

Polymerisation was performed as for seed O-4, but with 9 g instead of 12 g of 2,2-azobis(isobutyronitrile) and with the addition of 3 g of the enol ether of the formula I

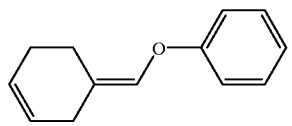

The seed polymer was worked up as in the case of seed O-1. The particle size of the resultant seed polymer and the monodispersity thereof are shown in Table 1.

TABLE 1

Seeds produced without a comb structure

| Seed | Particle size [μm] | Monodispersity [∅(90)/∅(10)] |
|------|--------------------|------------------------------|
| O-1  | 4.11               | 1.19                         |
| O-2  | 5.16               | 1.19                         |
| O-3  | 6.39               | 1.28                         |
| O-4  | 7.23               | 1.23                         |
| O-5  | 8.19               | 1.16                         |
| O-6  | 11.53              | 1.21                         |

General Production of Seeds K-1 to K-12 with a Comb Structure 2346 g of methanol, 300 g of monomer mixture (Table 2) and 180 g of polyvinylpyrrolidone K30 were mixed to yield a homogeneous solution in a 4 liter reactor equipped with a gate stirrer. At a stirring speed of 100 rpm, this solution was heated to 55° C. within 1 hour under nitrogen and a solution of 9 g of 2,2'-azobis(isobutyronitrile) in 165 g of methanol was added to the reactor. The polymerisation mixture was stirred for a further 20 hours at 55° C. and 100 rpm. The finished polymer dispersion was then cooled to room temperature. The resultant seed polymer was isolated in a methanolmoist state by settling and decanting.

The seed polymer was worked up as in the case of seed O-1. The particle size of the resultant seed polymer and the monodispersity thereof are shown in Table 2.

Production of Seed K-13 with a Comb Structure
Production of Solution A 541.75 g of a 10 w % aqueous solution of the monosodium salt of styrene/maleic acid copolymer were placed in a double-walled, 1 liter cylinder, which was equipped with a reflux condenser, a stirrer, a thermometer and a nitrogen inlet located below the level of the liquid. Nitrogen was introduced throughout the reaction to exclude air from the atmosphere in the reaction vessel. The solution was stirred at 100 rpm and heated to 65° C. 7.2 g of $K_2S_2O_8$ were then added. The reaction mixture was maintained at 65° C. for 2 hours. The mixture was then cooled to room temperature and subsequently used to initiate the polymerisation.

Production of Solution B

The following substances were placed at room temperature in a double-walled, 20 liter reaction vessel, which was equipped with a reflux condenser, a thermometer and a nitrogen inlet located below the level of the liquid:

| | |
|---|---|
| 1823.12 g | of demineralised water |
| 10324.6 g | of methanol |
| 3217.87 g | of methyl methacrylate |
| 65.67 g | of stearyl methacrylate |
| 65.67 g | of nonylphenol polyglycol ether (Hostapal B) |
| 4 g | of citric acid |

The reaction was performed under nitrogen. The mixture was stirred at 55 rpm and heated to 65° C.

Mixing of Solutions A and B 492.5 g of solution A were added to solution B within 3 minutes. Polymerisation was continued at a temperature of between 65° C and the reflux temperature of the reaction medium. 1 minute after addition of solution A to solution B, the previously clear solution B became a milky white dispersion. After polymerisation, the dispersion is cooled to room temperature with stirring. The dispersion was then filtered through a nylon cloth having a mesh size of 60×60 μm. 15.9 kg of a dispersion of small methyl methacrylate/stearyl methacrylate copolymer spheres, stabilised with a graft copolymer of methyl methacrylate/stearyl methacrylate copolymer and the sodium salt of the styrene/maleic acid copolymer, containing 21.19 g of small polymer spheres per 100 g of dispersion were obtained.

Production of Seed K-14 with a Comb Structure

The reaction was performed in a double-walled, 20 liter glass cylinder, which was equipped with a reflux condenser, a stirrer, a thermometer and a nitrogen inlet located above the level of the liquid. 258.76 g of a 20 wt. % aqueous solution of styrene/maleic anhydride copolymer, adjusted to pH 7,2156,44 g of distilled water and citric acid to establish a pH of 5 were placed in this reaction vessel at room temperature. The reaction vessel was flushed with nitrogen during the reaction. The above-stated mixture was stirred at 100 rpm, heated to 65° C. after 5 minutes' stirring and, after 45 minutes, once the temperature of 65° C. had been reached, combined with 6.9 0 g of potassium persulfate. The reaction mixture was stirred for a further 120 minutes and maintained at 65° C.

10075.74 g of methanol and then a prepared solution of 3381.00 g of methyl methacrylate, 69.0 g of stearyl methacrylate and 69.0 g of nonylphenol polyglycol ether were added at once. The mixture was maintained at 65° C. and, after approx. 35 minutes, changed from a clear solution into a milky white dispersion. Polymerisation was continued for 18 hours at 65° C., then the dispersion was cooled to 30° C. with stirring and filtered through a nylon cloth having a mesh size of 75×75 μm. 15800 g of a dispersion of small methyl methacrylate/stearyl methacrylate copolymer spheres, stabilised as in K-13, containing 22.2 g of small polymer spheres per 100 g of dispersion were obtained.

Production of Seed K-15 with a Comb Structure 159.16 g of a 19.1 wt. % aqueous solution of styrene/maleic anhydride copolymer, adjusted to pH 7,1355.2 g of distilled water and citric acid to establish a pH of 5 were placed at room temperature in a double-walled 10 liter glass cylinder, which was equipped like the reaction vessel for K-14. The reaction vessel was continuously flushed with nitrogen and air was excluded.

The mixture was stirred at 100 rpm, heated to 65° C after 5 minutes and, after 45 minutes, combined with 6.0 g of potassium persulfate. The reaction mixture was stirred for a further 120 minutes and maintained at 65° C. 4699.2 g of methanol and then a pre-mixed solution of 1490.35 g of methyl methacrylate, 30.4 g of stearyl methacrylate and 3 0.44 g of nonylphenol polyglycol ether were then added at once. The mixture was then maintained at 65° C. and, after approx. 35 minutes, changed its clear appearance to a milky white dispersion. Polymerisation was then continued for 18 hours at 65° C. and the mixture w as then cooled to 30° C. with stirring. Finally, the dispersion was filtered through a nylon cloth having a mesh size of 75×75 μm. 7670 g of a dispersion of small methyl methacrylate/stearyl methacrylate copolymer spheres, stabilised as in K-13, containing 20.4 g of beads per 100 g of dispersion were obtained.

TABLE 2

Seeds produced with a comb structure

| Seed | Monomer mixture: methyl methacrylate with | Particle size [μm] | Monodispersity [Ø(90)/Ø(10)] |
|---|---|---|---|
| K-1 | 2 wt. % ethyl methacrylate | 4.57 | 1.18 |
| K-2 | 25 wt. % ethyl methacrylate | 8.48 | 1.20 |
| K-3 | 2 wt. % n-butyl methacrylate | 5.75 | 1.19 |
| K-4 | 5 wt. % n-butyl methacrylate | 7.19 | 1.16 |
| K-5 | 25 wt. % n-butyl methacrylate | 10.12 | 1.22 |
| K-6 | 2 wt. % ethylhexyl methacrylate | 4.46 | 1.22 |
| K-7 | 25 wt. % ethylhexyl methacrylate | 6.64 | 1.19 |
| K-8 | 2 wt. % dodecyl methacrylate | 4.96 | 1.18 |
| K-9 | 5 wt. % dodecyl methacrylate | 4.96 | 1.20 |
| K-10 | 2 wt. % stearyl methacrylate | 6.04 | 1.20 |
| K-11 | 5 wt. % stearyl methacrylate | 3.71 | 1.17 |
| K-12 | 25 wt. % stearyl methacrylate | 2.51 | 1.49 |
| K-13 | 2 wt. % stearyl methacrylate | 5.38 | 1.16 |
| K-14 | 2 wt. % stearyl methacrylate | 7.22 | 1.19 |
| K-15 | 2 wt. % stearyl methacrylate | 3.06 | 1.13 |

Seed/Feed Polymers According to the Invention by the Static Process and Comparative Examples Seeds O-1 to O-6 and K-1 to K-12 were used in a seed/feed process in accordance with the following standard procedure.

2000 g of water, 500 g of seed dispersion (20.0 wt. %; Table 3) and 32 g of sulfosuccinic acid sodium salt (75 wt. %) were mixed in a 4 liter reactor equipped with a gate stirrer. At a stirring speed of 150 rpm, a feed of 400 g of methyl methacrylate and 5.33 g of dibenzoyl peroxide (75 wt. %) was added within 10 minutes to the seed dispersion under nitrogen. After a swelling time of two hours, this mixture was heated to 80° C. and stirred for a further 12 hours at 80° C. and 150 rpm. The finished polymer dispersion was then cooled to room temperature and the seed/feed polymer isolated by settling. The particle sizes of the resultant seed/feed polymers and the efficiency of the polymerisations are shown in Table 3.

The term efficiency is taken to mean the proportion of the monomer which soaks into the seed and polymerises therein relative to the total quantity of feed added. The proportion of the monomer which soaks into the seed and polymerises therein is calculated from the increase in particle diameter.
Seed/Feed Polymers According to the Invention by the Dynamic Process

Example 9

1500 g of seed K-13 were mixed with 90 g of nonylphenol polyglycol ether and 90 g of the monosodium salt of styrene/maleic acid copolymer in a 10 liter reactor, which was equipped with a stirrer, a thermometer, a nitrogen inlet and a reflux condenser. This reaction mixture was heated under nitrogen to 65° C. with stirring at 75 rpm. At this temperature, a previously produced emulsion of 900 g of methyl methacrylate, 12 g of benzoyl peroxide, 22.5 g of nonylphenol polyglycol ether, 22.5 g of the monosodium salt of styrene/maleic acid copolymer and 1861 g of water was added in 120 minutes. A temperature of 65° C. was then maintained for a further 16 hours and the mixture was finally filtered. After filtration, the concentration was 26.19 wt. %.

Example 10

Example 9 was repeated, with the exception that the feed was divided into an organic portion of methyl methacrylate and benzoyl peroxide and an aqueous portion of the remaining constituents. Both mixtures were separately, but simultaneously added in 120 minutes. The concentration after filtration was 26.51 wt. %.

Example 11

This Example was performed in the same manner as Example 10, except that the initiator benzoyl peroxide was added to the seed before all the other constituents were added. After filtration, the concentration was 26.9 wt. %.

Examples 12 and 13

The same method was used as in Example 11, except that the water, the surfactant, the stabiliser and the initiator were added to the seed before the monomer feed. The feed consisted solely of methyl methacrylate, which was added in 20 minutes. After addition of the feed, the temperature was raised to 85° C. After filtration, the concentration was 27.8 wt. %. In Example 12, K-13 was used as the seed and in Example 13, K-14.

Example 14

Dynamic Seed/Feed Process for the Production of a Highly Crosslinked Spherical Polymer According to the Invention 1500 g of seed K-15 were mixed with 90 g of nonylphenol polygicyol ether and 90 g of the monosodium salt of styrene/maleic acid copolymer in a 10 liter reactor, which was equipped with a stirrer, a thermometer, a nitrogen inlet and a reflux condenser. The mixture was heated under nitrogen to 65° C. with stirring at 75 rpm. At this temperature, 2 g of benzoyl peroxide were added. After 2 minutes, two feeds were simultaneously added over 120 minutes: feed 1 containing 440 g of methyl methacrylate, 360 g of 3-methacryloyloxypropyltrimethoxysilane and 12 g of benzoyl peroxide; feed 2 containing 22.5 g of nonylphenol polyglycol ether, 22.5 g of the monosodium salt of styrene/maleic anhydride copolymer and 3361 g of water. Once feeding was complete, the mixture was stirred for a further 16 hours at 85° C. The concentration after filtration was 17.31 w %.

TABLE 3

Seed/feed polymers produced

| Examples | Seed used | Particle size [μM] | Monodispersity [Ø(90)/Ø(10)] | Efficiency [%] |
|---|---|---|---|---|
| Comparison 1 | O-1 | 5.80 | 1.20 | 33.5 |
| Comparison 2 | O-2 | 6.77 | 1.24 | 31.5 |
| Comparison 3 | O-3 | 8.45 | 1.18 | 32.8 |
| Comparison 4 | O-4 | 9.52 | 1.15 | 32.0 |
| Comparison 5 | O-5 | 10.56 | 1.19 | 28.3 |
| Comparison 6 | O-6 | 14.93 | 1.17 | 28.3 |
| Example 1 | K-1 | 6.25 | 1.18 | 39.0 |
| Comparison 7 | K-2 | 11.11 | 1.21 | 31.3 |
| Example 2 | K-3 | 7.77 | 1.09 | 36.8 |
| Example 3 | K-4 | 9.70 | 1.10 | 36.5 |
| Comparison 8 | K-5 | 13.26 | 1.19 | 31.3 |
| Example 4 | K-6 | 6.12 | 1.20 | 39.5 |
| Comparison 9 | K-7 | 8.37 | 1.11 | 25.0 |
| Example 5 | K-8 | 6.70 | 1.18 | 36.5 |
| Example 4 | K-9 | 6.97 | 1.15 | 44.3 |
| Example 7 | K-10 | 8.61 | 1.21 | 47.5 |
| Example 8 | K-11 | 5.38 | 1.16 | 51.3 |
| Comparison 10 | K-12 | 3.23 | 1.22 | 28.3 |
| Example 9 | K-13 | 7.94 | 1.16 | 88 |
| Example 10 | K-13 | 7.94 | 1.16 | 89.6 |
| Example 11 | K-13 | 7.93 | 1.17 | 89.9 |
| Example 12 | K-13 | 7.94 | 1.16 | 88.4 |
| Example 13 | K-14 | 10.49 | 1.20 | 87.4 |
| Example 14 | K-15 | 4.61 | 1.13 | 93 |

What is claimed is:

1. A process for the production of monodisperse spherical polymers having a weight-averaged average particle diameter of 1 to 50 µm using a seed/feed process comprising the following steps:
   a) suspension of a monodisperse spherical seed in an aqueous phase,
   b) addition of at least one monomer and an initiator and
   c) polymerization of the monomer, of which there is at least one,
wherein the seed consists essentially of a polymer having a comb structure.

2. The process according to claim 1, wherein the monomer is added to the aqueous suspension of the seed particles at room temperature and the resultant reaction mixture is heated to the polymerization temperature of the monomer.

3. The process according to claim 1, wherein the aqueous suspension of the seed particles is heated to a polymerization temperature, and the monomer is added at a rate of at most $\frac{1}{30}$ g per g of seed polymer per minute.

4. The process according to claim 1, wherein the seed has an average particle size of 0.5 to 15 µm and a quotient of the $90^{th}$ centile value (ø(90)) and the $10^{th}$ centile value (ø(10)) of the volume distribution of less than 2.0.

5. The process according to claim 1, wherein the monodisperse spherical seed is a copolymer of
   a) 99.5 to 80 wt. % of methyl (meth)acrylate and
   b) 0.5 to 20 wt. % of at least one (meth)acrylic acid alkyl ester having a $C_2$ to $C_{22}$ alkyl residue.

6. The process according to claim 5, wherein the (meth)acrylic acid alkyl ester is a $C_2$ to $C_{22}$ ester of Methacrylic acid.

7. The process according to claim 1, wherein the polymerization is performed in the presence of a surfactant.

8. The process according to claim 7, wherein the surfactant is a salt of sulfosuccinic acid.

9. The process according to claim 1, wherein the initiator is used in a quantity of 0.05 to 6.0 wt. %, relative to the feed.

10. A spherical polymer made by the process as claimed in claim 1.

11. A sintering material for the production of 3D models by laser sintering which comprises the spherical polymer as in claim 10.

12. A spacer which comprises the spherical polymer as in claim 10.

13. The spacer as claimed in claim 12, wherein the spacer is used in film materials, LCD screens or in image receiving materials for non-impact printing processes.

14. The process as claimed in claim 4, wherein the seed has an average particle size of 0.5 to 15 µm and a quotient of the $90^{th}$ centile value (ø(90)) and the $10^{th}$ centile value (ø(10)) of the volume distribution of less than 1.5.

15. The process according to claim 5, wherein the monodisperse spherical seed is a copolymer of
   a) 99 to 85 wt. % of methyl (meth)acrylate and
   b) 1 to 15 wt. % of at least one (meth)acrylic acid alkyl ester having a $C_2$ to $C_{22}$ alkyl residue.

16. The process according to claim 5, wherein the monodisperse spherical seed is a copolymer of
   1. 98 to 90 wt. % of methyl (meth)acrylate and
   2. 2 to 10 wt. % of at least one (meth)acrylic acid alkyl ester having a $C_2$ to $C_{22}$ alkyl residue.

17. The process according to claim 4, wherein the seed has an average spherical particle size of 1 to 12 µm.

18. The process according to claim 4, wherein the seed has an average spherical particle size of 3 to 10 µm.

* * * * *

UNITED STATES PATENT AND TRADEMARK OFFICE
CERTIFICATE OF CORRECTION

PATENT NO. : 6,291,553 B1
DATED : September 18, 2001
INVENTOR(S) : Harrison et al.

Page 1 of 1

It is certified that error appears in the above-identified patent and that said Letters Patent is hereby corrected as shown below:

<u>Title page,</u>
Inventor Frank Louwet's address is shown as "Diepenwek (BW). The correct address is -- Diepenbeek (BE) --.

The Assignee shown as "AGFA-Gevaert (BE)" should read as -- AGFA-GEVAERT (BE) --.

<u>Column 11,</u>
Line 32, "Methacrylic" should read as -- methacrylic --.

Signed and Sealed this

Twenty-eighth Day of May, 2002

Attest:

*Attesting Officer*

JAMES E. ROGAN
*Director of the United States Patent and Trademark Office*